Jan. 20, 1925.    1,523,972
P. W. JOHNSON
STUMP PULLER
Filed Dec. 2, 1921    8 Sheets-Sheet 1

Fig.1

Inventor
Peter W. Johnson
By *[signature]*
Attorney

Jan. 20. 1925.

P. W. JOHNSON

STUMP PULLER

Filed Dec. 2, 1921

Inventor
Peter W. Johnson

By
Attorney

Jan. 20, 1925.

P. W. JOHNSON

STUMP PULLER

Filed Dec. 2, 1921

Inventor
Peter W. Johnson

By

Attorney

Patented Jan. 20, 1925.

1,523,972

UNITED STATES PATENT OFFICE.

PETER W. JOHNSON, OF COEUR D'ALENE, IDAHO.

STUMP PULLER.

Application filed December 2, 1921. Serial No. 519,462.

*To all whom it may concern:*

Be it known that I, PETER W. JOHNSON, a citizen of the United States, residing at Coeur d'Alene, in the county of Kootenai and State of Idaho, have invented certain new and useful Improvements in Stump Pullers, of which the following is a specification.

My said invention relates to a stump pulling machine and it is an object thereof to provide a machine of the character described which shall clear the land and prepare it for the plow in a single operation.

A further object is to provide a machine that shall be strong and adapted for hard usage and at the same time shall be quick in its action.

A further object is to provide a machine using steam power, since fuel is plentiful and readily available.

Another object is to provide a machine with attachments such as self-operating brush tongs and self-dumping skidding tongs to complete the work of clearing the ground.

Other objects are to provide a machine that may be loaded on one flat-car, that is equipped with a tractor to haul it over ordinary roads or along old logging-roads, that can drag itself about a clearing without any previous dismounting of parts, and that can operate equally well on a level or on a considerable grade or incline.

Referring to the accompanying drawings which are made a part hereof and on which similar reference characters indicate similar parts, Figures 1 and 1ª together show my device in side elevation, Figure 2 a detail elevation at the right-hand side of Figure 1ª.

Figures 3 and 4 are details of the invention,

Figure 8 is a side view of the brush tongs in open position, Figure 9 a similar view in closed position, Figure 10 a plan thereof, Figure 11 a detail of controlling levers and connections leading therefrom in my machine, Figure 12 an elevation of a portion of the boom with skidding tongs attached thereto, Figure 13 a detail of steering mechanism, Figure 14 a side elevation of a truck on the boom, Figure 15 a plan of the same, Figure 16 a transverse section through the truck and the boom.

Referring to the drawings 20 indicates a set of skids on which the device may be mounted when in working position. The stump puller is mounted on a wheeled truck which is supported on the skids and which is held in working position by means of U-bolts 21 passing through bars 150 (Fig. 1) on the truck and then down underneath curved ears on clamps 22 fastened to the skids by bolts 23. The wheeled truck when not on skids forms a tractor which may be driven under its own power from one location to another. It has side members 151 in the form of I-beams supporting a bearing 152 for a gear 45 hereinafter described.

The beams 151 carry front and rear, cross-beams 153 and 154 respectively, the front cross-beam being secured to the I-beams by brackets 155 above and plates 156 beneath bolted to each other, the brackets being riveted to the I-beams. Beam 154 is pivotally connected to the I-beams by a hinge pin 157, this being lower than the front beam to leave room for the hinge and the pin passing through a cross-bar 158 of the truck riveted to beams 151 at each end. By this construction the truck is made to rest on three points and as the U-bolts which hold the skids to the cross timbers are so designed that they can be left a little loose the skids are allowed to conform to the surface of rough ground without undesirable strain on the truck. The power plant on the truck also provides means for dragging the skids for short distances. When operating in the field a wood sawing machine may be hitched on at the rear of the tractor, this being for the purpose of providing fuel for the power plant from the wood immediately at hand.

The truck 24 supports a platform 25 in position for rotation on the body of the truck. This platform supports a vertical engine 26 and a pair of horizontal engines 27 and 28, all driven by steam from a common boiler 29 which may also have connections to cylinders on the wood-sawing machine to operate the saw. The truck also supports a framework on which are mounted sets of hoisting drums 30, 31 and 32, each set comprising a pair of drums mounted for rotation on a common axis. Uprights 33 with braces 34 located immediately adjacent the drums act as supports for pulleys 35 and 36 adjacent to certain of said drums. At the opposite end of the platform from the boiler 29 there is pivotally supported a swinging boom 37. The vertical engine 26 comprises a pair of cylinders connected in ordinary manner to gear 38 which drives gear 39. Gear 39, through a train of mechanism comprising a shaft 40, beveled pinions 41 and 42, spur gears 43 and 44, and pinion 45 meshing with a stationary gear 46, rotates the platform 25 in either direction about a vertical axis on the body of the truck.

Figure 5:
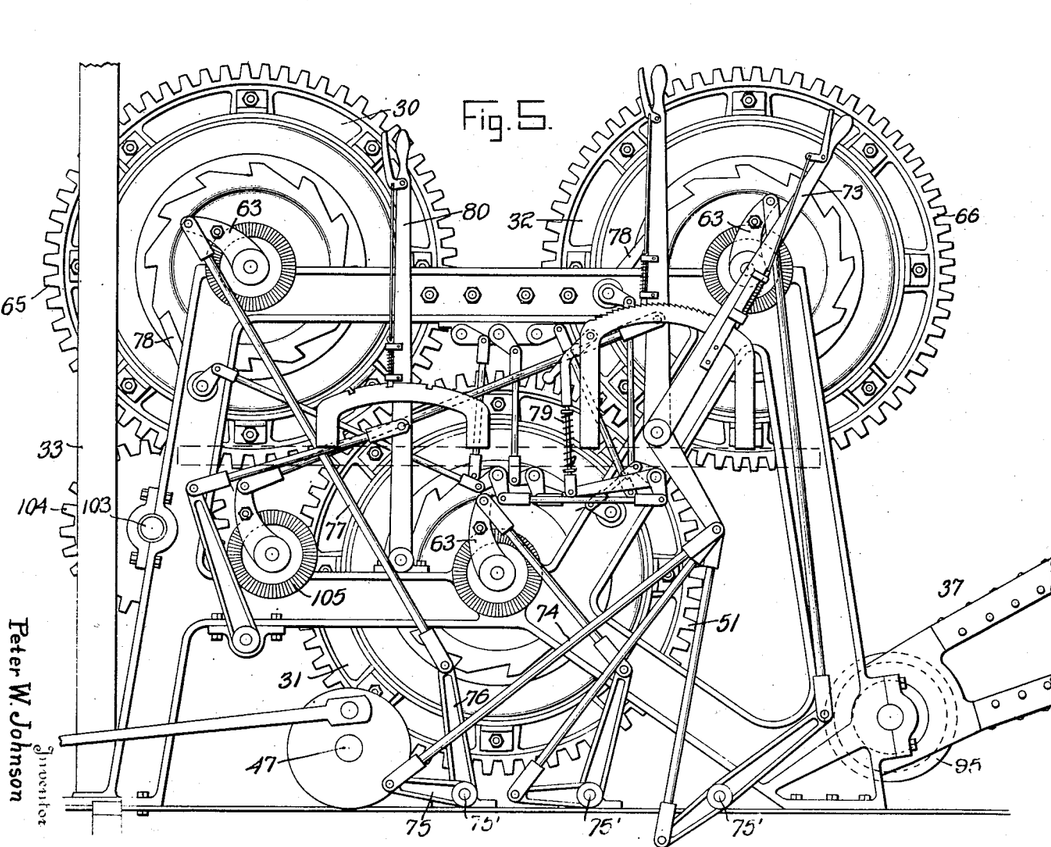
Figure 5 is a partial elevation taken at the right hand side of the machine.
Figure 7:
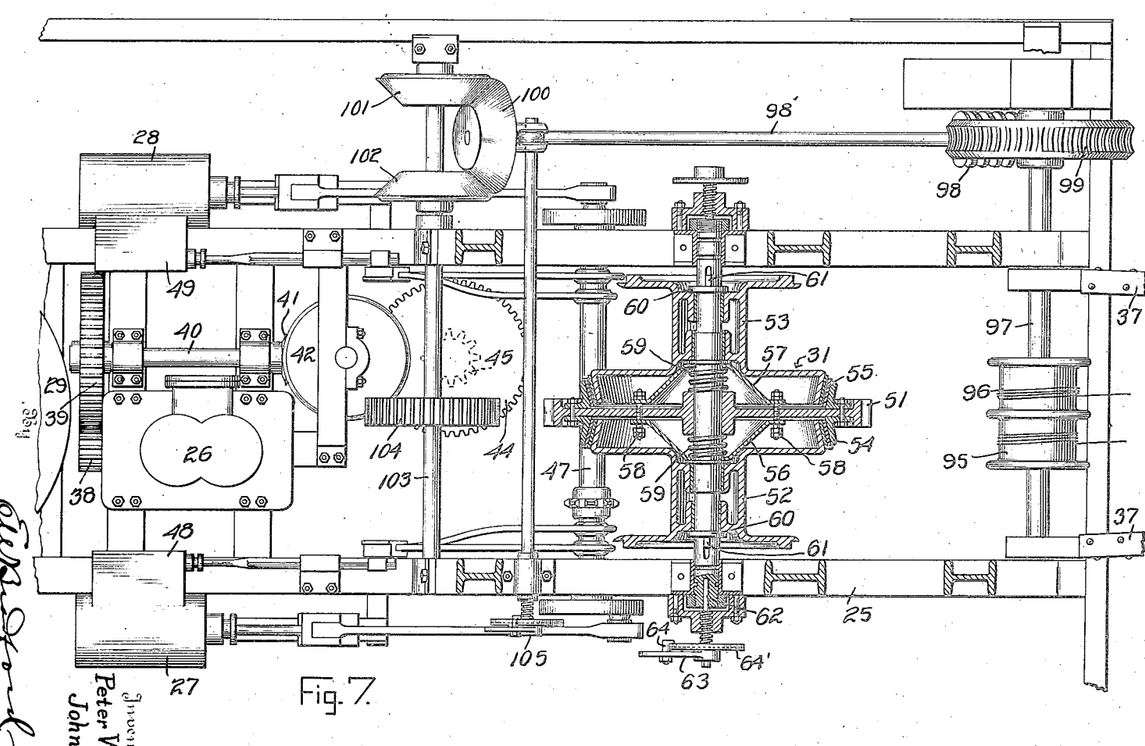
Figure 7 a plan of the principal working parts, the remaining parts being broken away or omitted.

The cylinders 27 and 28 are connected in ordinary manner to a crank shaft 47 having ordinary connections for controlling admission of steam to the steam chests 48 and 49. This crank shaft carries a pinion 50 which drives a gear 51. The gear 51 is situated between a pair of winding drums 52 and 53, the gear having clutch faces 54 and 55 at opposite sides adapted to be engaged by corresponding clutch faces on the winding drums. Also supported by the gear 51 are a pair of cones 56 and 57 each having a flange at its outer periphery parallel to the gear 51. A series of bolts 58 are threaded into the body of gear 51 and these bolts carry nuts serving to limit the travel of cones 56 and 57. Between each cone and the hub of the gear is mounted a spring 59 normally acting through the cone to move its winding drum away from the hub of the driving gear. Adjacent each drum is a collar 60 on the shaft, this collar being moved longitudinally on the shaft to move the drum and quickly take up wear on the clutch by means of a transverse bar 61 actuated by a pin 62 which forms an extension of a screw having fixed thereto a disk 64' with clutch teeth on one face (Figures 5 and 7). A correspondingly-toothed arm 63 is journaled on the hub of disk 64' and is locked in adjusted position by a bolt 64.

The clutch operating mechanism so far as described is substantially identical for each of the six drums, the clutch operating connections being described hereinafter. Gear 51 drives gears 65 and 66 each of which forms a driving means for a pair of winding drums having clutch connection therewith substantially similar to that above described.

A set of hand levers is provided (Figs. 5 and 11) in a position convenient to the seat 67 for the operator, each lever from 68 to 73 constituting means for controlling the action of one of the winding drums. In Figure 5 such a lever is shown as having a connection by means of a rod 74 to a rock arm 75 this being fast to another rock arm 76 and being connected by a rod 77 to a clutch operating arm 63. All the levers are at one side of the truck (Fig. 11) and motion is transmitted to the opposite side to control the drums at that side by means of shafts 75' to which certain of the hand-levers are connected, said shafts in some instances forming pivots for rock arms 75 and 76.

Figure 11:
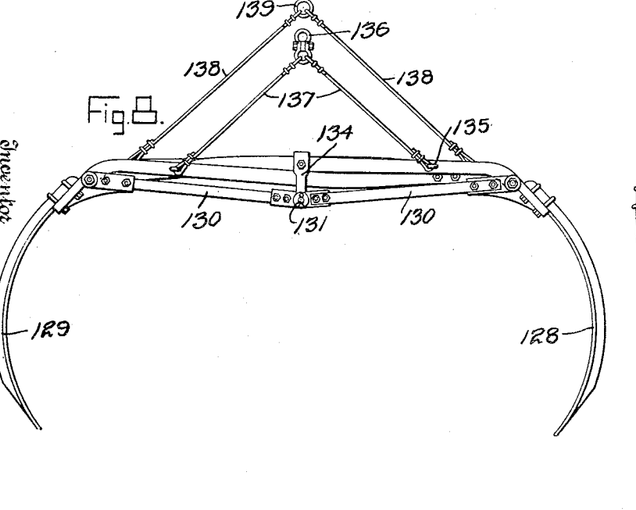

Each drum, when its clutch is out, is held against reverse rotation by a pawl 78 and these pawls are held in working position by a series of springs of which one is shown at 79 in Figure 5, the spring being located in a train of connections not fully shown from the clutch controlling lever to the pawl so arranged that the pawl will be thrown out after the clutch has taken hold. A reversing lever for the horizontal hoisting engines is shown at 80 in Figure 5 in intermediate position. Figure 11 shows at 81 a foot lever for controlling the steam feed to the hoisting engines and at 82 a foot lever for controlling the steam feed to the vertical engine for swinging the platform, while 83 indicates a reversing lever for the latter engine.

Figure 6:
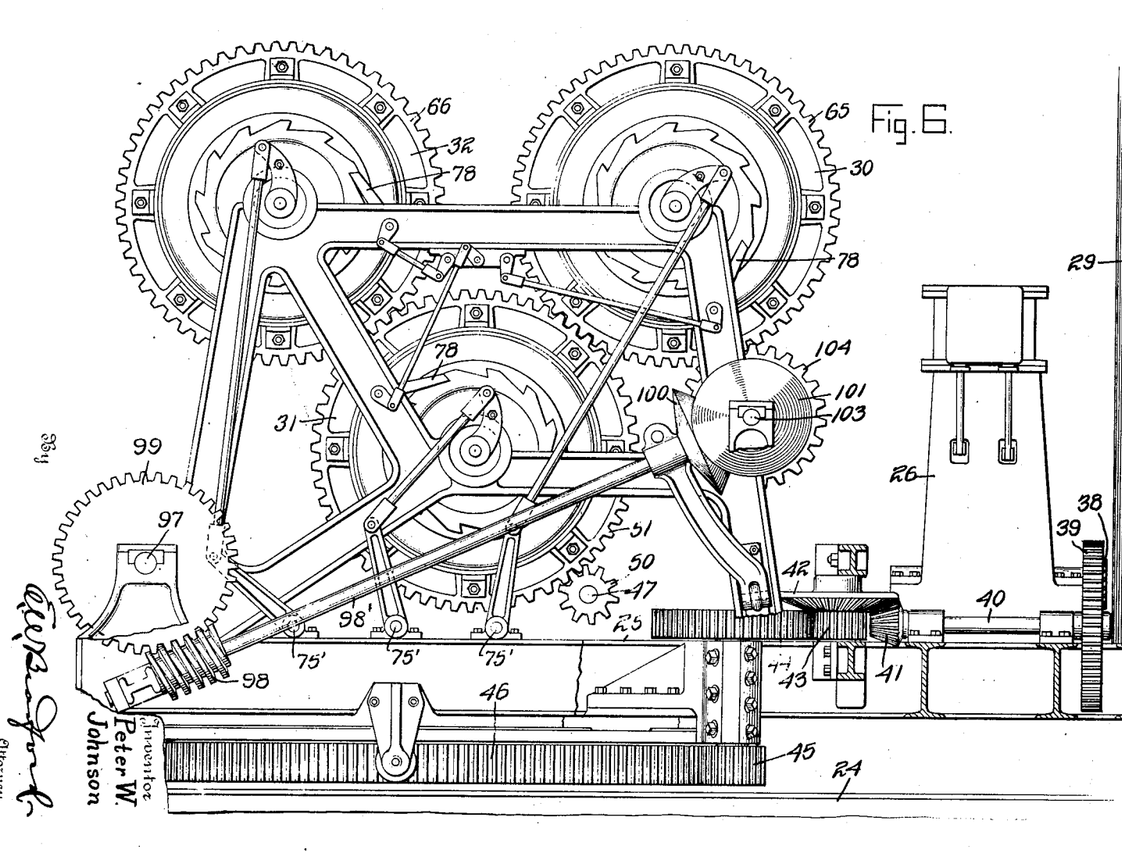
Figure 6 a partial elevation at the left-hand side.
Figures 11, 12, 13, 14, 15, 16:
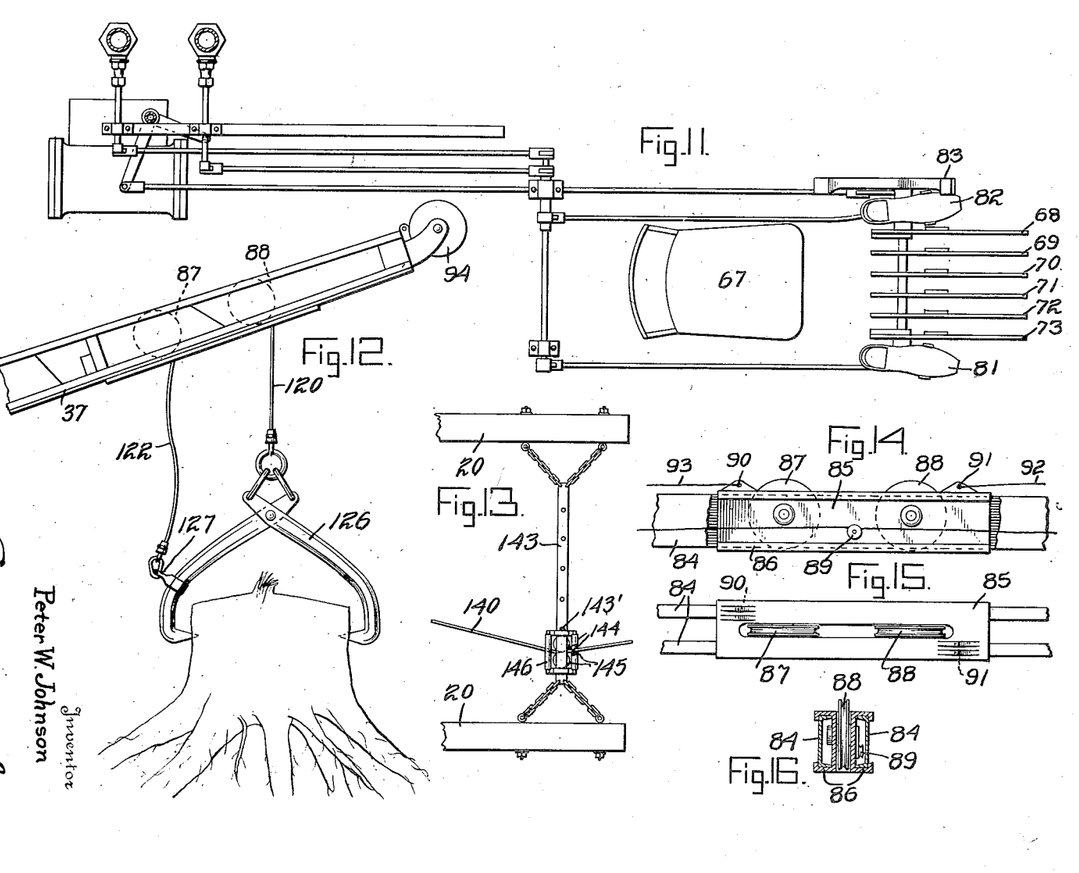
Figure 17:
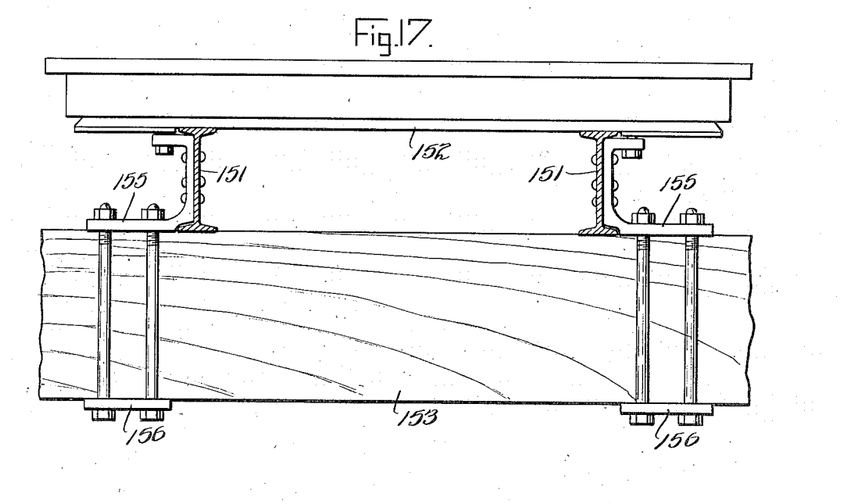
Figure 17 is a section on line 17—17 of Figure 1.
Figure 18:
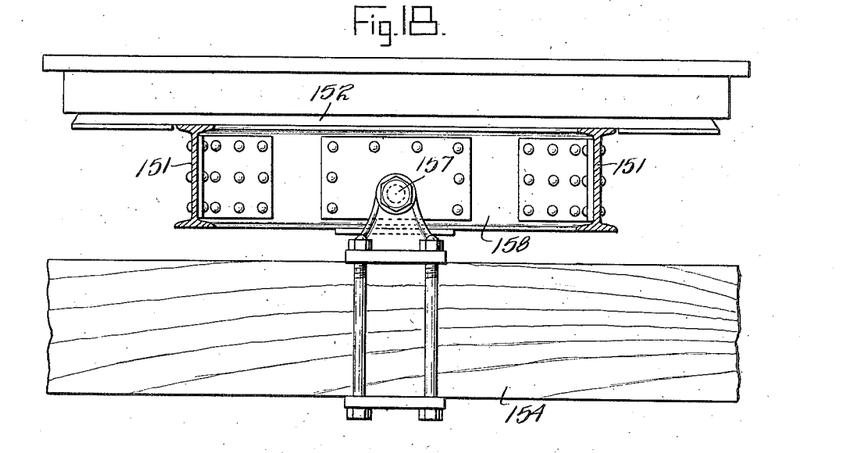
Figure 18 a section on line 18—18 of Figure 1.

The boom 37 comprises a pair of truss-like side members and transverse connections and said boom includes between the sides a track formed of opposed channel bars 84, Figure 16. A carriage 85 is supported for traveling movement longitudinally of the boom by means of side members 86 which substantially enclose track members 84 (Fig. 16). This carriage supports a pair of pulleys 87 and 88 and a small guide roller 89. In upwardly extending projections on the carriage there are formed a pair of openings at 90 and 91 for attachment of the ends of a pair of cables 92 and 93. Cable 92 extends from 91 out to the end of the boom, about a pulley 94, thence back alongside the carriage over the roller 89, down to the lower end of the boom where it is wound on a drum 95 (Fig. 7) to which the other end is attached. Cable 93 is attached to the carriage at 90 and passes thence along the boom to the drum 96 about which it is wound and to which it is attached. These drums are mounted on a shaft 97 driven by a worm 98 through a worm gear 99 in reverse directions to wind the cables back and forth on the drums 95 and 96 and thereby move the carriage along the boom. Worm 98 is fixed on a shaft 98' having a friction gear 100 driven in opposite directions by either one of a pair of friction gears 101, 102 on a shaft 103 having a pinion 104 meshing with gear 65 (Fig. 6). The reversing apparatus for the friction gearing is similar to that for operating the clutches, being indicated at 105 in Figures 5 and 7.

The carriage 85 forms a movable support for a traveling frame in the form of an A-shaped prop 106 adapted to stand adjacent to the stump to be pulled. The A-shaped prop consists of a pair of inclined members connected at the top and braced by a crosspiece near the lower end. Each of the inclined members has at its lower end a foot piece comprising a flat member 107 having ball and socket connection to the members supported thereby, the foot piece being attached to this upright by a plurality of springs 108. This connection permits the foot piece to swing relative to the upright and accomodate itself to inequalities in the ground adjacent the stump. A pair of sheaves 109 and 110 are suspended from the top of the prop between the uprights. The lower sheave supports, by means of a ring, a loop of heavy cable 111 adapted to be placed about the stump as a sling and held in position thereon by means of holding devices 112. These holding devices are shown in detail in Figures 3 and 4 and comprise a pair of side channels 113 for the opposed runs of the rope and a strengthening member 114 of any convenient form located between and supporting the runways for the runs of cable. A lighter form for light work may comprise a single flat piece of metal bent up at both ends to form ears for the rope, the middle portion being also bent into arcuate form to approximate the curve of a stump. In the form shown the spacer may be held in place by a pair of bolts 115 or may be made integral with the remainder of the device as desired. A biting member or tooth 116 projects inward from the body of the holding device and bites into the stump to prevent slipping. It will be seen that the holding member may be slipped upward on the cable until enough of the latter is exposed to wind about the stump as shown in Figure 1ª when the holding member may be brought down to position and the cable tightened about the stump.

Figure 1:
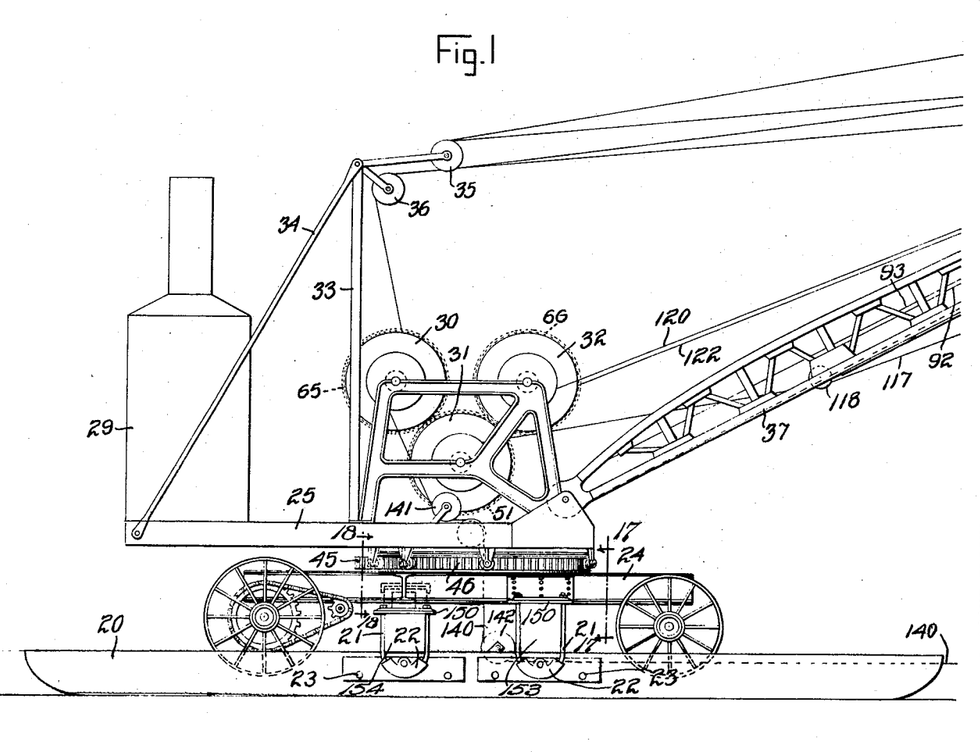
Figures 1, 2, 3, 4:
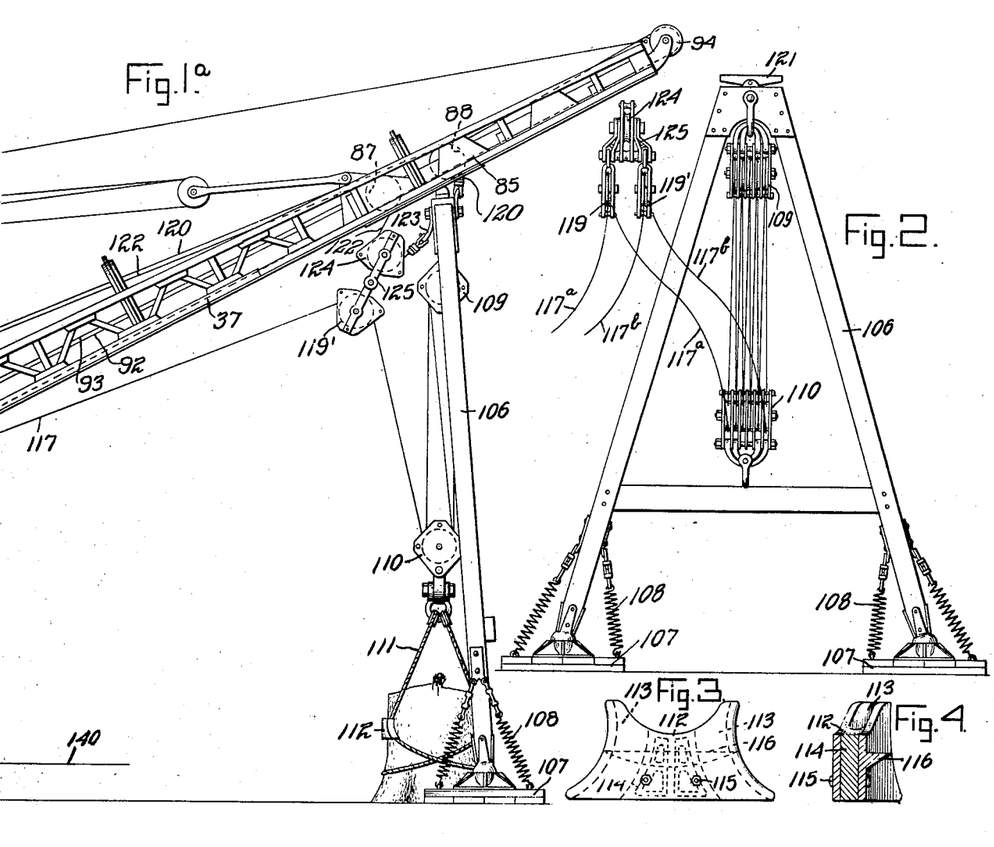

A main cable, here shown as having two runs 117, 117', extends from the winding drums at 31, underneath a guide roller 118 on the boom, over separate pulleys 119, 119' and thence to the sheaves 109 and 110 as shown in Figures 1 and 2, this cable being the ordinary main stump pulling cable. Another cable 120 extends from the right-hand member of the pair of drums at 32 up to the carriage 85 and from pulley 88 to a ring or staple on the prop 106. This cable forms the supporting and manipulating member for the A-shaped support by means of which the support may be lowered into operative position adjacent to a stump after which the boom is lowered until it rests on the upper member 121 of the support 106 forming a three-point support for the A-shaped member.

Finally a cable 122 extends from the other drum of the pair at 32, over the pulley 87 and to a fastening device 123 on the prop. Intermediate the pulley 87 and said fastening device is a pulley 124 which is connected by a bifurcated frame 125 to the pulleys 119 and 119' said frame supporting the latter and thus the bights of cable 117 117' (Fig. 2). It will be seen that when the parts are in the position shown in Figure 1ª the pulling action on the stump may take place through both runs of the ordinary pulling cable 117 117' and the sheaves on the prop or through one only of said runs or through the cable 122 which acts by way of pulley 124 to haul on the bight in cable 117 thus furnishing additional power, or if desired tension may be exerted on all three of these cables. Tension is exerted on both runs only until the load becomes excessive, when one drum is clogged while the other pulls. When the load lets up, both may be utilized again.

It is my intention to provide the machine with a set of skids about thirty feet in length with a spread of seventeen feet to make it possible to operate without guy lines, and to provide engines and associated parts which will enable a pulling power of four tons on a cable to be obtained. The boom should be of a length to operate over a space eighty feet in width thereby leaving a seventy foot space between the timber line, if any, and the brush pile to permit burning of the brush in dry weather without danger of fire. I have provided means for piling up the extracted stumps along such a line comprising skidding tongs shown at 126 in Figure 12, these skidding tongs being suspended from cable 120. One of the jaws of the tongs has a ring attached thereto at 127 to which the cable 122 may be connected. In this way a stump may be elevated and carried to the desired place after which a pull on cable 122 will release the same.

Figure 9:
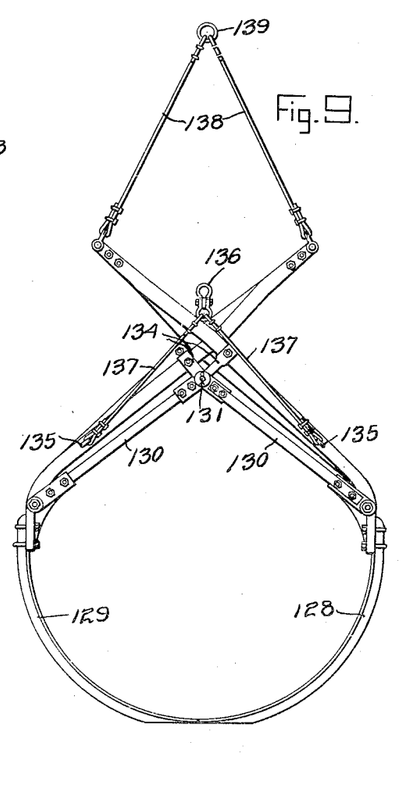
Figure 10:
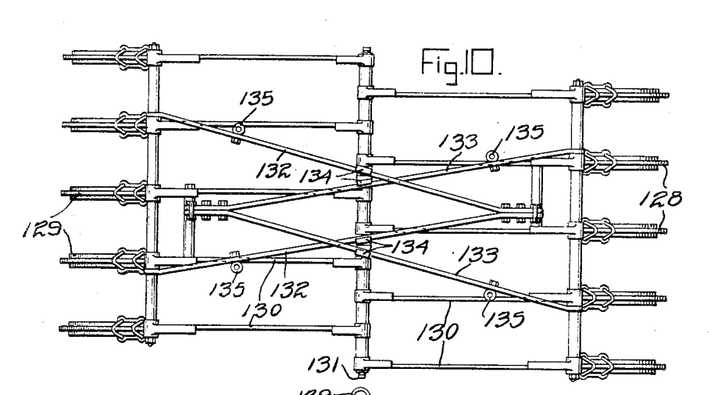

For gathering brush and piling it up I have shown brush tongs in Figures 8 to 10 comprising any desirable number of opposed jaws 128 and 129. These jaws are connected by bars 130 to a central longitudinal rod 131. The jaws comprise oppositely extending members 132 and 133 rigidly connected to certain jaws of the respective opposed sets and said oppositely extending members are attached by links 134 to the rod 131. Intermediate their length each of said members carries eyes 135 to which is attached a common eye 136 by means of rods or cables 137, the eye 136 being intended for attachment to the cable 122. At their extreme ends the members 132, 133 are connected by rods or cables 138 to a ring 139 adapted to be attached to cable 120. As the brush hook is lowered by cable 122 it will be held in open position as in Figure 8 to cover a considerable extent of ground. The cable 122 being now slackened and the cable 120 being tightened the opposed jaws on the brush hook will scrape along the ground and gather up a large quantity of brush as they close into the position shown in Figure 9. The hook will then be raised and the boom swung to dumping position after which the strain on cable 120 will be relieved and the brush hook being supported only by cable 122, the jaws will be opened as in Figure 8 thus dumping the load.

For steering the entire device in moving from place to place I have provided means indicated in Figures 1, 1ª and 13. The cable 140 passes from the right-hand drum 30 down about a series of guide pulleys 141, then about pulley 142 and thence to a stump or other stationary device to which it may be attached. The forward angle of movement is determined by means of the device shown in Figure 13 which is fixed at the forward end of the skids. This consists of a bar 143 which may be rigidly attached to the skids but preferably is fastened by short lengths of chain affixed to the skids. This bar has a series of holes and supports a small carriage movable transversely of the skids. The carriage has vertical guide rollers 145 and horizontal guide rollers 144 and 146 between which the cable 140 passes. The carriage may be adjusted and held in place by one or more pins 143' passed into the holes in the bar 143 and thus will determine the angle of movement of the skids and the parts carried thereby in a well-known manner.

Operation.

In the operation of the device after the machine has been placed on skids to which it is fastened by the U-bolts as shown in Figures 1 and 1ª, the U-bolts being left somewhat loose to permit the skids to accommodate themselves to uneven ground without straining the superposed devices to an undue degree, brush chains are attached to cables 120 and 122 and with them the brush within reach is pulled up and placed on either side the path of the machine in small piles leaving an opening wide enough for the machine to move forward. The forward movement is effected by anchoring cable 140 in advance of the machine when the latter may be moved from 10 to 15 feet at a setting.

To pull up stumps the A-shaped frame is lifted by cable 120 and the boom is swung into position over the stump, after which the A frame is adjusted to position by moving the sliding block in the boom nearly over the stump. The A frame and boom are lowered into the position illustrated in Figure 1ª, the boom being lowered into position to rest on the top of the A frame. The bifurcated frame 125 is adapted to swing into position for alining the sheaves 109 and 110 with the respective drums so as to cause the pull from the drums to be at all times in direct line with the stump, this being to compensate for variations that may arise because of inequalities in the ground or because the ground under one foot of the A frame is softer than that under the other.

The cable slings hanging in the lower block are now placed about the stump, the stump-gripping device being also brought into holding position as shown in Figure 1ª. After this the winding drums are operated to lift the stump as hereinbefore explained. When the stump has been raised to a sufficient height the earth may be knocked off from the roots so as to fill the hole that would otherwise be left by the stump. Should the stump be in the path of the machine the boom may be swung to one side to carry the stump out of the way after which the slings are released and the operation repeated.

When all the stumps within reach have been extracted the A frame is laid aside and the cables 120 and 122 detached therefrom, the brush tongs being now attached to said cables after which the brush is collected and dumped in a pile ready for burning. The skidding tongs may then be attached to the same cables and the stumps piled on top of the brush this giving the most advantageous arrangement for burning. Should there be large roots left in the ground they may be removed by attaching a special root hook to the cables 120 and 122 and pulling them up.

It will be observed that all the principal operations may be performed by the engineer without leaving his seat from which seat he controls the foot levers for determining the operation of the engines and the hand levers for controlling the operation of the winding drums, to extract stumps and brush from the ground and pile the same. By this latter feature I am able to dispense with the hazardous work of a man on the brush pile; in fact, the danger of clearing land by extracting stumps and burning the stumps and brush is practically done away with.

It will be obvious to those skilled in the art that many changes may be made in my machine and in the various parts thereof without departing from the spirit of the invention, the true scope of which is shown by the appended claims. It will also be evident that the machine may be useful for other purposes and that parts or sub-combinations thereof may be used in other relations all within the scope of my invention.

Having thus fully described my said invention, what I claim as new and desire to secure by Letters Patent, is:

1. In a stump pulling machine, a support adapted for movement of translation, skids fixed under the support, a platform rotarily mounted thereon, said platform sustaining a swinging boom, a plurality of winding drums and separate engines for rotating the platform and for operating the winding drums one of said drums carrying a cable having an end extending downward centrally of the platform and lengthwise of the support whereby the support may be moved from place to place, substantially as set forth.

2. A stump pulling machine comprising a truck, a platform on the truck, an engine on the truck adapted to drive the same as a tractor, a stump pulling device on the platform also adapted to be operated by said engine, a set of skids adapted to carry said truck and U-bolts connecting ears on the truck yieldingly to ears on the skids, substantially as set forth.

3. A stump pulling machine comprising a boom adapted for vertical oscillation, a truck on the boom adapted to travel lengthwise thereof, a frame carried by the truck adapted to rest at its lower end on the ground adjacent the stump and to support at its upper end the outer portion of the boom, and stump extracting means connected to the boom and to said frame, substantially as set forth.

4. A stump extracting machine comprising a boom adapted for vertical oscillation, a support mounted to travel along the boom, means carried by the support adapted to be positioned adjacent the stump and to support the boom at its free end and cables extending from the boom to said means and adapted to be connected to a stump for extracting the same, substantially as set forth.

5. In a stump extracting machine, a support, a boom mounted thereon for vertical oscillation, winding drums on the support, a truck movable longitudinally of the boom, cables extending from the winding drums over pulleys on the truck, and means supported by said cables adapted to be positioned adjacent the stump and to support the free end of the boom, substantially as set forth.

6. In a stump-extractor, a platform, a boom supported thereby, a pulley movable along the boom, means suspended from the pulley and movable therewith adapted to sustain the free end of the boom, and stump extracting means also movable along the boom with said pulley, substantially as set forth.

7. In a stump-extractor, a platform, a boom supported thereby, a pulley movable along the boom, means suspended from the pulley and movable therewith adapted to sustain the free end of the boom, stump extracting means also movable along the boom with said pulley, and power-operated means on the platform to adjust said pulley along the boom, substantially as set forth.

8. In a stump-extractor, a platform, a boom supported thereby, a pulley movable along the boom, means suspended from the pulley and movable therewith along the boom adapted to sustain the free end of the boom, stump extracting means also movable along the boom with said pulley, power-operated means on the platform to adjust said pulley and to raise and lower the boom, substantially as set forth.

9. In a stump-extractor, a platform, a boom supported thereby, a pulley movable along the boom, means suspended from the pulley and movable therewith adapted to sustain the free end of the boom, stump extracting means also movable along the boom with said pulley, power-operated means on the platform to adjust said pulley, and to raise and lower independently or simultaneously the boom and its sustaining means, substantially as set forth.

10. In a stump-extractor, a platform, a boom supported thereby, a pulley movable along the boom, means suspended from the pulley and movable therewith adapted to sustain the free end of the boom, stump extracting means also movable along the boom with said pulley, power-operated means on the platform to adjust said pulley, to raise and lower the boom and its sustaining means, and to raise and lower the stump extracting means, substantially as set forth.

11. In a stump pulling machine, a platform, a boom swingably supported thereby, independently operable winding drums on the support, cables carried by the drums and means adapted for interchangeable attachment to a single pair of said cables for supporting the free end of the boom during stump extracting operations, for gathering and piling up brush and for carrying stumps to the brush pile and dumping them thereon, substantially as set forth.

12. In a stump pulling machine, a platform, a boom swingably supported thereby, independently operable winding drums on the support, cables carried by the drums and means adapted for interchangeable attachment to the same pair of cables for supporting the free end of the boom during stump extracting operations and for extracting stumps at such times or for gathering and piling up brush, substantially as set forth.

13. In a stump extracting machine, a platform, a boom swingably supported thereby, winding drums carried on the platform, a truck movable along the boom, means carried by the truck for supporting the free end of the boom, sheaves carried by said supporting means, a cable passing from the drums over said sheaves adapted for connection to a stump to be extracted, a cable passing from another drum to the upper end of the support, a floating frame carried by said last named cable and pulleys on said frame through which the stump pulling cable is passed, substantially as set forth.

14. In a stump pulling machine, a rotary support, a boom swingably carried thereby, pulleys on the support, a cable passing over one of said pulleys, brush tongs comprising oppositely extending bars, opposed jaws at their free ends, means at the other ends of the bars connected to said cable for closing the jaws, a second cable passing from another pulley means for operating the cables independently and means connected to an intermediate portion of said bars and to the second cable for dumping the brush tongs, substantially as set forth.

15. In a stump extracting machine, a rotary platform, a boom swingable thereon, a truck movable longitudinally of the boom, means carried thereby for supporting the free end of the boom and means for moving the truck along the boom comprising winding drums, a pair of cables connected to the truck and to the respective drums, one of said cables extending over a pulley at the forward end of the boom and thence back to the truck, an engine on the platform and gearing connecting said engine to said winding drums, substantially as set forth.

16. A stump extracting machine comprising a rotary platform, a boom swingable thereon, winding drums on the platform, cables carried by the drums for manipulating the boom, for moving the machine and for connection to stumps to be extracted, a seat on said platform for the engineer and a series of levers in front of said seat including foot levers for controlling the operations of the engines and hand levers for controlling the various drums, substantially as set forth.

17. In a stump pulling machine, a rotary platform, a swingable boom thereon, winding drums carried thereby, cables on the drums for moving the machine and for controlling the operations of the machine, engines on the platform for revolving the platform and for operating the winding drums, a seat on the platform for the engineer, a pair of spaced foot levers in front of said seat for controlling the engines individually and a series of hand levers between said foot levers for controlling the operations of the winding drums, substantially as set forth.

18. In a stump pulling machine, a support adapted for movement of translation, a rotary platform thereon, a swingable boom on the rotary platform, winding drums on the rotary platform, cables carried by the drums for moving the machine, for swinging the boom and for connection to stumps or other objects to be moved, and means for controlling said drums comprising a clutch for each drum, a positively acting brake to prevent reverse movement thereof and a hand-lever for each clutch said hand lever having means for releasing the brake after the clutch is applied, substantially as set forth.

19. In a stump pulling machine, a support adapted for movement of translation, a rotary platform thereon, a swingable boom on the rotary platform, winding drums on the rotary platform arranged in alined pairs, cables carried by the drums for moving the machine, for swinging the boom and for connection to stumps or other objects to be moved, and means for controlling said drums comprising a gear between the winding drums of each pair and means for clutching either drum to said gear, substantially as set forth.

20. In a stump pulling machine a support adapted for movement of translation, a rotary platform thereon, a swingable boom on the rotary platform, alined pairs of winding drums on the rotary platform, cables carried by the drums for moving the machine, for swinging the boom and for connection to stumps or other objects to be moved, and means for controlling said drums comprising alined pairs of drums, a gear intermediate the drums of each pair, hand levers at one side of the platform for actuating each of said drums independently to move them into clutching engagement with the respective gears, substantially as set forth.

21. In a stump extracting machine, a support, a swinging boom thereon, winding drums on the support, a pulley mounted to travel along the boom, a cable on one of said drums passing over said pulley, a traveling frame carried thereby, means on the frame for sustaining the free end of the boom, a cable on another drum passing over a pulley on said traveling frame and adapted to be secured to a stump, substantially as set forth.

22. In a stump extractor, a pair of skids, a platform supported thereby, a drum on the platform, means for driving the drum, a cable on the drum extending down through the platform and having a free end adapted to be attached to an object in front of the stump extractor, and guides on the machine for guiding the cable including a guide near the front end of the skids adjustable transversely of the machine for steering the machine, substantially as set forth.

23. In a stump extractor, a pair of skids, a rotary platform supported thereby, stump pulling devices supported by the platform, a cable extending through the platform and forward from the machine, and guides on the machine for said cable including a guide supported between the skids adjacent to their front ends and adjustable crosswise of the machine for steering the same, substantially as set forth.

24. In a stump-pulling device, a wheeled truck cross-beams on the truck between the front and rear sets of wheels, bars extending over the cross-beams, skids supporting the truck, curved ears on the skids, and U-shaped bolts engaging under said ears said bolts extending along opposite sides of said beams and through said bars, substantially as set forth.

25. In a stump-pulling machine, a supporting structure, a rigid A-shaped frame carried thereby and adapted to straddle a stump, a cable secured to the upper end of said frame, a floating frame having a sheave resting on said cable, a sheave depending from the upper end of said A-shaped frame, a floating sheave below the depending sheave, gripping means sustained by the floating sheave, and a cable passing about the depending and floating sheaves and over a pulley on the floating frame, substantially as set forth.

26. A stump extracting machine comprising a rotary platform, a boom swingable thereon, winding drums on the platform, cables carried by the drums for manipulating the boom, for moving the machine and for connection to stumps to be extracted, separate engines for operating the winding drums and for rotating the platform, a seat on said platform for the engineer and a series of levers in front of said seat including spaced foot levers for controlling the operations of the engines, and hand levers between them for controlling the various drums all of said levers having a common pivot, substantially as set forth.

27. In a convertible hoisting machine, a boom, means for swinging the boom laterally, a prop for supporting the boom in stationary position, a pair of cables attached to the prop, and grappling means adapted to be attached to said cables in place of said prop one of said cables raising the grapple and the other opening it, substantially as set forth.

28. In a hoisting machine, a boom, means for swinging the boom laterally, and a prop carried by the boom movable bodily laterally relatively thereto, substantially as set forth.

29. In a hoisting machine, a boom, means for swinging the boom laterally, and a prop carried by the boom movable bodily along the same, substantially as set forth.

30. In a hoisting machine, a boom, means for swinging the boom laterally, and a prop carried by the boom movable bodily up and down relatively thereto, substantially as set forth.

31. In a hoisting machine, a boom, means for swinging the boom laterally, and a prop carried by the boom movable bodily along said boom and also movable laterally relatively thereto, substantially as set forth.

32. In a hoisting machine, a boom, means for swinging the boom laterally, and a prop carried by the boom movable bodily up and down and laterally relatively to the boom, substantially as set forth.

33. In a hoisting machine, a boom, means for swinging the boom laterally, and a prop carried by the boom movable bodily along the boom and also up and down relatively thereto, substantially as set forth.

34. In a convertible hoisting machine, a boom, means for swinging the same laterally, grappling means, a prop, cables on the boom adapted to be interchangeably connected to the grappling means for respectively lifting and opening the same or to the prop whereby one cable acts to raise and lower the same relatively to the boom and the other partakes in a load-hoisting operation, and means for operating said cables, substantially as set forth.

35. In a convertible hoisting machine, a boom, means for swinging the boom laterally, a prop for the boom movable bodily along the boom, and hoisting means movable with said prop, substantially as set forth.

36. In a hoisting machine, a boom, means for swinging the boom laterally, a prop for the boom carried by said boom movable bodily laterally relatively thereto, and means for attachment to a stump movable with said prop, substantially as set forth.

37. In a hoisting machine, a boom, means for swinging the boom laterally, a prop for the boom carried by said boom movable bodily laterally relatively to the boom, means for attachment to a stump movable with said prop, a power-operated drum on the body of the machine, and a cable on said drum connected to said stump-attaching means, substantially as set forth.

38. In a hoisting machine, a boom, means for swinging the boom laterally, a prop for supporting the boom in stationary position, a sheave carried by the prop, a cable passing over the sheave, means carried by the cable for attachment to a stump, a cable attached to the prop, a pulley on said cable, a floating frame carried by the pulley, a pulley on the frame over which said first-named cable passes, and means for operating said cables in pulling a stump, substantially as set forth.

39. In a hoisting machine, a boom, means for swinging the boom laterally, a prop for supporting the boom in stationary position, a cable attached to the prop, a floating frame carried by said cable, a pulley on the frame, a cable passing over said frame to an object to be lifted, and means for operating said cables, substantially as set forth.

40. In a hoisting machine, a boom, a prop therefor, a plurality of winding drums, a sheave fixed to the prop, a floating sheave, means carried by the latter sheave for attachment to a stump or the like, and a cable having two runs each passing about the fixed and floating sheaves and thence to independent winding drums, substantially as set forth.

41. In a hoisting machine, a boom, a prop therefor, a plurality of winding drums, a sheave fixed to the prop, a floating sheave, means carried by the latter sheave for attachment to a stump or the like, a cable on one of said drums secured to the prop near its upper end, a floating frame having a pulley mounted to travel on said cable and a pair of pulleys at its lower end, and a cable having two runs each passing about a pulley on said frame then about said fixed and floating sheaves and then to one of said winding drums, substantially as set forth.

42. In a stump extractor, a pair of skids, a drum carried thereby for winding up a cable, a bar at one end of the machine between the skids, means connecting the ends of the bar flexibly to the skids, a guide adjustable along said bar, a cable passing from said drum through said guide adapted to be attached to a fixed object at a distance from the machine, substantially as set forth.

43. In a stump puller, a rotary platform, a boom laterally and vertically swingable thereon, winding drums on the platform, cables carried by said drums independent cables being connected to manipulate the boom to move the machine from place to place and to be attached to objects to be lifted whereby said last-named cables move along the boom, engines on the platform for rotating the platform and for operating the winding drums, a seat on the platform for the engineer, a pair of spaced foot levers adjacent to said seat for controlling said engines, and a series of hand levers between said foot levers for controlling said drums, substantially as set forth.

44. In a stump puller, a rotary platform, a boom laterally and vertically swingable thereon, winding drums on the platform, cables carried by said drums independent cables being connected to manipulate the boom to move the machine from place to place and to be attached to objects to be lifted whereby said last-named cables move along the boom, engines on the platform for rotating the platform and for operating the winding drums, a seat on the platform for the engineer, a pair of spaced foot levers adjacent to said seat for controlling said engines, a series of hand levers between said foot levers for controlling said drums, and a common pivot for said hand and foot levers, substantially as set forth.

In witness whereof, I have hereunto set my hand and seal at Coeur d'Alene, Idaho this twenty-fifth day of November, A. D. nineteen hundred and twenty-one.

PETER W. JOHNSON. [L. S.]

Witnesses:
T. E. HEDAL,
FRED H. WILLIAMS.